No. 749,576. Patented January 12, 1904.

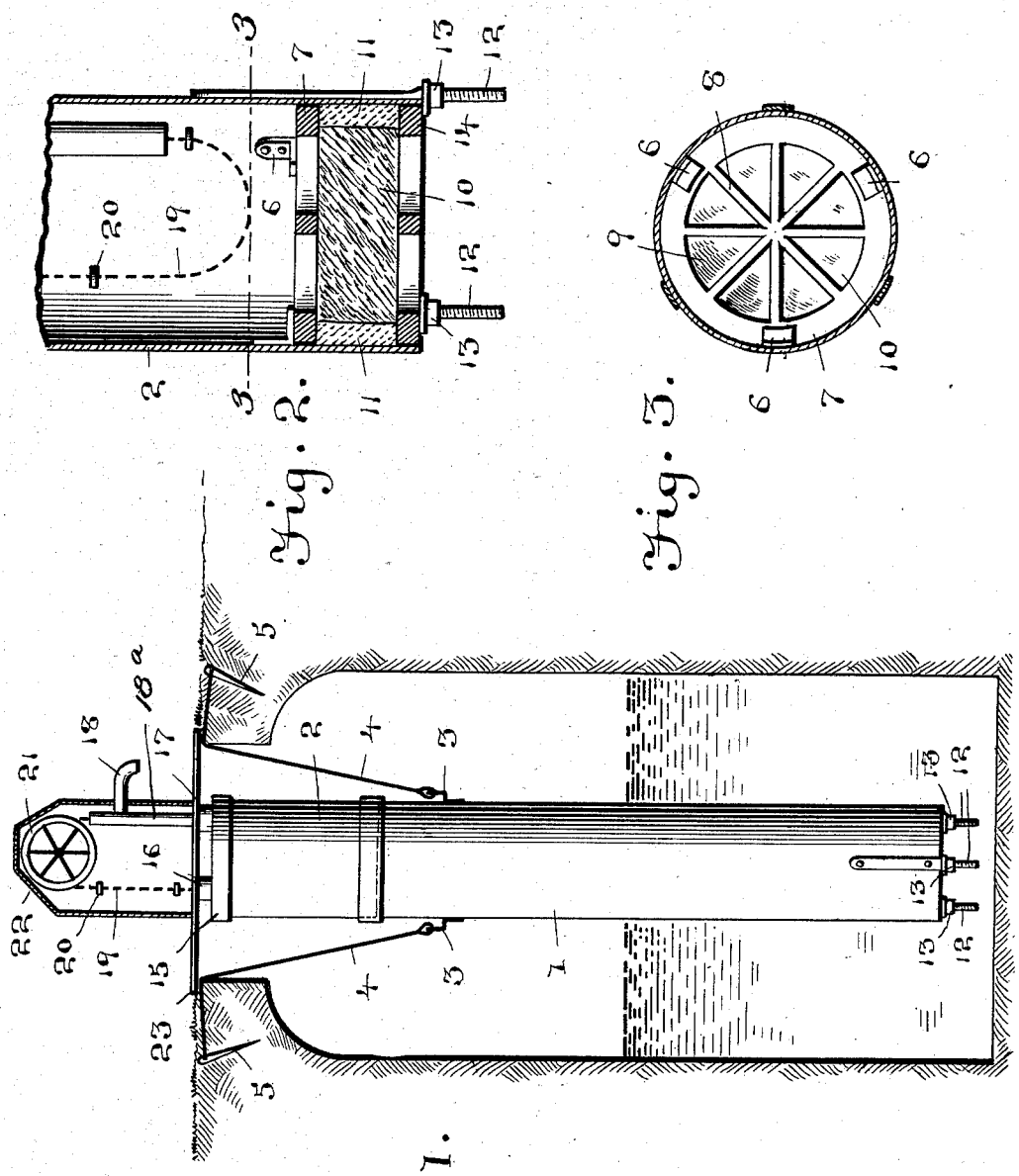

UNITED STATES PATENT OFFICE.

WILSON NOLES, OF MONTROSE, IOWA.

FILTER.

SPECIFICATION forming part of Letters Patent No. 749,576, dated January 12, 1904.

Application filed March 4, 1903. Serial No. 146,150. (No model.)

*To all whom it may concern:*

Be it known that I, WILSON NOLES, a citizen of the United States, residing at Montrose, in the county of Lee and State of Iowa, have invented new and useful Improvements in Filters, of which the following is a specification.

This invention relates to water-filters, but more particularly to the type used for filtering water in wells or cisterns.

The object of the invention is to provide a filter which can be conveniently located within the well or cistern, so as to thoroughly filter the water before it is raised through the pump positioned within the filter.

Broadly stated, the invention consists in providing a stand-pipe or hollow cylinder of suitable dimensions, in which the pump is located, and supporting a suitable porous plug or end wall in the stand-pipe, which is held by clamping-jaws between which the porous plug is positioned.

The invention consists of other novel features which will become apparent by reference to the following description, in connection with the accompanying drawings, in which—

Figure 1 is a view in elevation of a filter and pump constructed in accordance with my invention. Fig. 2 is a fragmentary vertical sectional view through the lower end of the stand-pipe, and Fig. 3 is a cross-sectional view on line 3 3, Fig. 2.

The casing or cylinder is comprised of two sections 1 and 2. The lower section 1 is in the form of an elongated cylindrical tube, which is formed with peripheral eyes 3, to which are connected radially-disposed flexible connections 4, carrying on their ends pickets or pins 5, which can be driven into the soil adjacent to the mouth of the cistern or well, so as to suspend the filter at a proper point within the same. Near the lower extremity of the tube 1 are inwardly-disposed knees or projections 6, against which one of the spiders for holding the filtering-stone bears. This spider is designated by the reference-numeral 7 and comprises a ring connected to a plurality of intersecting radially-disposed arms 8, dividing the interior portion of the ring into a series of segmental spaces 9 to permit the filtered liquid to pass up into the stand-pipe or cylinder 1.

The stone 10 may consist of any substance suitable for the purpose and may be formed of any composition of matter, or soapstone may be employed, if desired. I do not limit myself to the particular kind of material, being aware that many suitable filtering blocks or plugs could be used for this purpose. The diameter of the stone is slightly less than the diameter of the stand-pipe, and the space between the walls of the stand-pipe and stone is filled with any well-known hydraulic cement, as indicated by the reference-numeral 11. The advantage of interposing cement between the walls of the stand-pipe and filtering-block is to prevent the liquid passing between the walls instead of directly through the filtering bed or block.

A number of longitudinally-arranged depending threaded shanks 12 are carried by the lower end of the stand-pipe 1 and receive threaded nuts or taps 13, which can be screwed upon the shanks to adjust the lower and movable spider 14 into engagement with the plug or block 10, so as to securely clamp it between the spider 14 and the spider 7. The spider 14 is approximately of the same construction as the one designated by the reference-numeral 7, and by reference to Fig. 2 it will be noted that the widths of the rings are sufficient to cover the space between the filtering-block and the wall of the stand-pipe, thus preventing any liability of the water passing up between the stand-pipe and the block. When it is necessary or desirable to remove the filtering-block, the nuts can be unscrewed, and by removing the spider 14 the filtering-block can be withdrawn from the stand-pipe.

The upper section 2 is suitably connected to the section 1 and is provided at its top with a cap 15, having openings 16 and 17 therein. The pump-cylinder $18^a$ extends through the opening 17 down to a point adjacent to but above the filtering-block. An endless chain passes through the pump-cylinder, carrying suitable buckets for raising the water up to a level with the discharge-spout 18, from which it will empty into suitable receptacles. The chain is designated by the reference-numeral 19, and 20 designates the buckets. Both the chain and buckets pass over an idle pulley or wheel 21, suitably supported in a housing or casing 22, carried by the well-cover 23. By turning the wheel 21 motion will be imparted to the chain, forcing the buckets up through the pump-cylinder, and thereby raising only the filtered water.

When it is necessary to clean out the interior of the stand-pipe, the upper section 2 will be removed after removing the well-cover, so that access can be had to the stand-pipe 1. As soon as the interior of the stand-pipe has been cleaned the parts can be reassembled and the device will be ready for use.

In the foregoing description I have shown the preferred form of my invention; but I do not limit myself thereto, as I am aware that modifications may be made therein without departing from the spirit or sacrificing the advantages thereof, and I therefore reserve the right to make such changes as fairly fall within the scope of my invention.

Having thus described the invention, what is claimed as new is—

1. In a device of the character described, the combination with a cylindrical casing having a filtering-wall at one end thereof, and means for removing the liquid from the casing, of a plurality of radially-disposed flexible connections secured to the casing, and pins or pickets on the ends of the connections to be driven into the ground whereby the casing will be supported within a cistern or well.

2. In a device of the character described, the combination with a cylindrical casing, a spider in one end of the casing, a second spider parallel with the first spider and adjustably disposed with relation thereto, a block interposed between the two spiders, the diameter of which is less than the diameter of the casing, and a filling of cement interposed between the wall of the block and the wall of the casing.

3. In a device of the character described, the combination with a casing, of depending threaded shanks carried by one end of the casing, a filtering-block in the end of the casing having the shanks, a stop for limiting the movement of said block in one direction, a spider bearing against the filtering-block, and threaded nuts on the shanks to adjustably clamp the spider in engagement with the block.

In testimony whereof I affix my signature in presence of two witnesses.

WILSON NOLES.

Witnesses:
EMIL WOHRER,
LOUISE W. STANWOOD.